Figure 1:
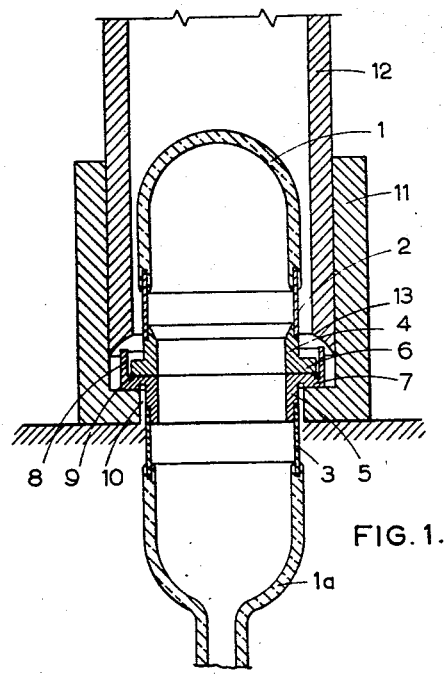

Oct. 25, 1960     K. H. KREUCHEN     2,957,236
METHOD OF FORMING HERMETIC SEALS BY
PRESSURE WELDING METAL PARTS

Filed June 27, 1955     2 Sheets-Sheet 1

INVENTOR
K. H. KREUCHEN
BY
ATTORNEYS

# United States Patent Office 2,957,236
Patented Oct. 25, 1960

2,957,236
METHOD OF FORMING HERMETIC SEALS BY PRESSURE WELDING METAL PARTS

Karl Heinz Kreuchen, Hounslow, England, assignor to Electric & Musical Industries Limited, Hayes, Middlesex, England, a company of Great Britain Filed June 27, 1955, Ser. No. 518,277

Claims priority, application Great Britain July 7, 1954

11 Claims. (Cl. 29—470.1)

This invention relates to the method of forming hermetic seals by pressure welding metal parts together.

For many purposes such as in the electronic art it is desirable to provide an hermetic seal between two metallic parts. For example, in the manufacture of certain types of thermionic valves it is sometimes desirable to make the valve envelope in two parts, each composed of a glass portion sealed to a metallic portion and then subsequently to provide an hermetic seal between the two metallic portions so as to complete the assembly of the envelope of the device. Heretofore the provision of such hermetic seals between metallic parts has usually involved the application of heat which in some cases is undesirable since it may be required to prevent any oxidation of the parts which oxidation frequently occurs when the seal is affected by heat.

It is known that metals can be cold-welded together under pressure and in particular it is known to provide a cold-weld between copper parts. However, in order to provide a reliable and hermetic seal between copper parts, it is necessary to effect deformation of the metal to the order of 80% or more. For certain applications, deformation of copper parts to such an extent is undesirable.

It is an object of the invention to provide an improved method of forming an hermetic seal between metal parts by the interposition of another metal between said parts and pressure welding said parts together.

According to the invention there is provided a method of forming a hermetic seal between two metal parts by uniting surface sealing areas of said parts by pressure welding comprising arranging a surface sealing area of one of said parts adjacent to a surface sealing area of the other part with indium interposed between said surface sealing areas of both parts and applying a sufficient pressure to cause said surface sealing areas and said indium to make intimate contact to effect a diffusion of indium into the surface sealing areas of both said parts without the application of heat sufficient to melt the indium, and thereby form said seal. It has been found that indium cold-welds easily to other metals and diffuses at room temperature readily into such other metals forming a firm and vacuum tight bond. Such a bond does not, however, provide a mechanically strong joint and in cases where such a joint is required it is preferred to form the surfaces between which the seal is required in such a manner that during the pressing operation the parts interengage with one another in such a manner as to provide the required strength for the seal. The surfaces between which the seal is required are preferably made of copper, although other materials such as aluminum may in some cases be employed, although aluminium is not particularly suitable for use in electronic discharge devices.

Figure 2:
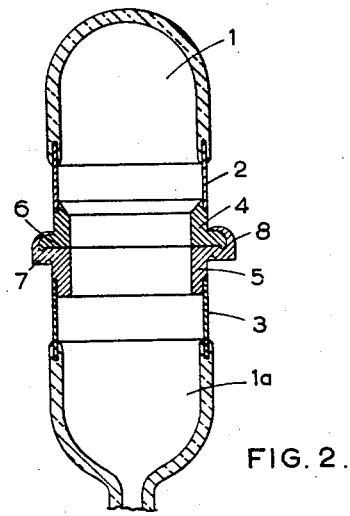
Figure 3:
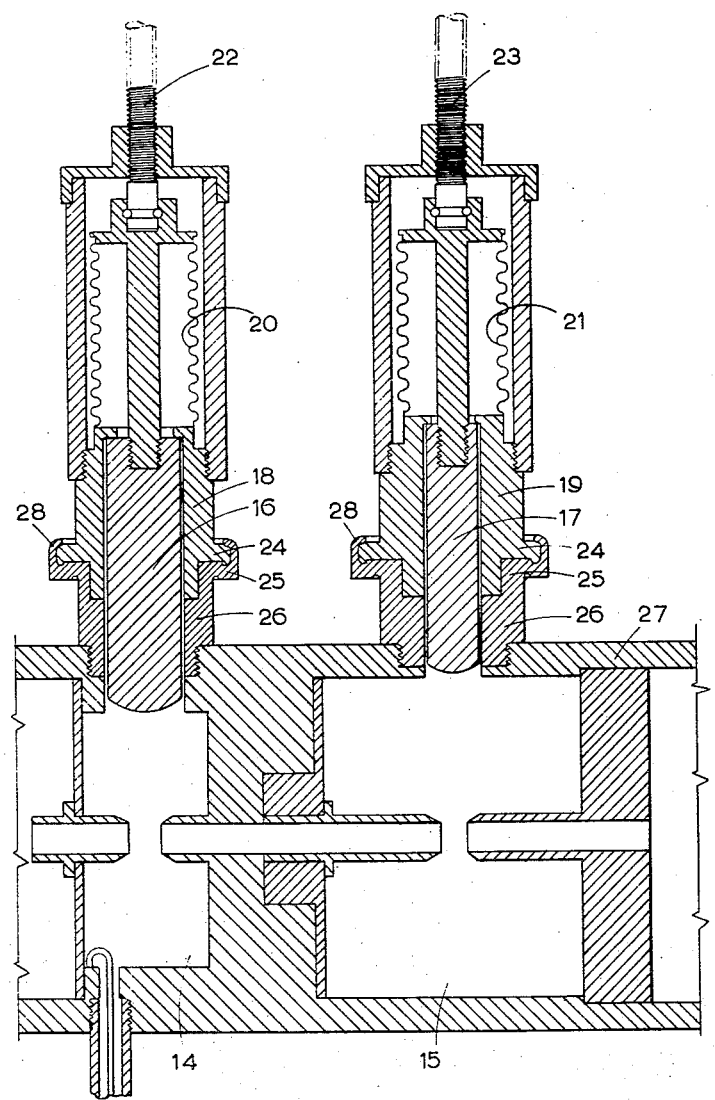

In order that the said invention may be clearly understood and readily carried into effect, it will now be described with reference to the accompanying drawings, in which:

Figure 1 illustrates the application of the invention to the formation of an hermetic seal between the two portions of an envelope of electron discharge device, Figure 2 is a view showing the seal after formation, and Figure 3 illustrates the application of the invention to the sealing of parts in an electron discharge device employing cavity resonators.

As shown in Figure 1 of the drawings, an envelope for an electron discharge device comprises a glass portion 1 and another glass portion 1a, the ends of which are hermetically sealed to sleeves 2 and 3 respectively each formed of a metal which seals well to the glass 1, 1a, for example Kovar and these sleeves 2, 3 in turn secured to copper rings 4 and 5. If desired further small sleeves made of nickel may be interposed between the sleeves 2, 3 and the rings 4, 5 in order to prevent intergranular penetrations of the Kovar metal by the solder. The ring 4 is provided with a flange 6 and the ring with a flange 7 having an upstanding rim 8 which when the two flanges are in facing contact with one another projects above the surface of the flange 6. An annular groove is provided in the flange 7 to accommodate a thin wire ring 9 of indium, the groove being so disposed that the indium ring 9 contacts with the lower surface of the flange 6. An annular groove 10 is also provided in the lower face of the flange 7. The copper rings 4 and 5 are annealed to ensure that the copper is as ductile as possible and the parts of the envelope are assembled together in the manner shown in Figure 1 and are inserted in a press comprising a lower tool 11 upon which the flange 7 is seated and a tool 12 provided with a concave lower edge 13. Pressure is applied to the tool 12 so that the concave edge 13 of the tool deforms the rim 8 in the manner shown in Figure 2 and the flange 6 so that the volume of the groove containing the indium ring 9 is appreciably reduced and the indium is forced to flow along the faces of the two flanges wetting the copper and diffusing into the copper at the same time. Thus, the indium serves to provide an hermetic seal, whilst the swaging of the rim 8, as indicated in Figure 2, serves to clamp the surfaces together and provide for the mechanical strength required for the seal. The annular groove 10 serves to accommodate for the deformation of the metal during the pressing operation without changing the internal diameter of the ring 5.

The use of a separate ring of indium in the manner shown in Figure 1 is preferred although, of course, in some cases one or both surfaces between which the seal is required to be made may be plated with a layer of indium. Although the invention has been illustrated in Figures 1 and 2 as applied to the joining of the two portions of an envelope of an electron discharge device, it will be appreciated that the invention can be readily applied to the formation of hermetic seals between other parts. One example of a further application of the invention is shown in Figure 3 as applied to a device employing cavity resonators, the resonators being indicated at 14 and 15 respectively, each of the resonators being tuned by means of tuning plungers 16 and 17. The tuning plungers are arranged within sleeves 18 and 19, and are supported thereby via metal bellows 20, 21 connected to the adjusting means 22, 23 for the plungers 16, 17. The sleeves 18 and 19 are composed of copper and are provided with outwardly extending flanges 24 which cooperate with flange 25 formed on copper sleeves 26 secured to the wall 27 of the resonators 14, 15. The flange 25 is provided with rim 28 and the sleeves 18, 19 and 26 are cold-welded together by the use of an indium ring as described with reference to Figures 1 and 2.

After formation of hermetic seals in electron discharge devices it is often desired to bake such devices to comparatively high temperature and it is found that an hermetic seal formed between two copper parts in accordance with the invention can be baked up to 600° C. without deterioration of the seal. It may be mentioned, of course, that with the baking of such a seal the bond between the copper and the indium will be strengthened since an additional alloy of indium and copper is then formed.

Although the invention has been described as applied to electron discharge devices it will, of course, be appreciated that the invention can be applied to any device where an hermetic seal is required to be formed without the use of heat and where excessive deformation of the parts to be sealed is undesirable.

What I claim is:

1. A method of forming a hermetic seal between adjacent surfaces of two metal parts by cold pressure welding, comprising forming a groove in one of said metal parts adjacent to the surface to be sealed, locating indium within said groove, arranging the surface of said other metal part in proximity to said indium containing groove, and applying pressure at room temperature between said metal parts to urge said surfaces towards each other and said indium to flow between said surfaces and to diffuse into each of said metal parts to thereby effect said welded seal.

2. A method of forming a hermetic seal between two metal parts by cold pressure welding, said metal parts each having a flange portion extending therefrom, a surface of one of said flange portions being complementary with a surface of said other flange portion, a groove in one of said flange portions located in a surface opposite to one of said complementary surfaces, introducing indium metal between said complementary surfaces and applying pressure to said flange at room temperature to urge said complementary surfaces together and effect a diffusion of said indium into both of said flanges said groove accommodating the distortion of the metal of said flange caused by the pressure applied to effect the hermetic weld between said complementary surfaces.

3. A method of forming a hermetic seal between two metal parts by cold pressure welding, said metal parts each having a flange portion extending therefrom, a surface of one of said flange portions being complementary with a surface of said other flange portion to form sealing surfaces, a groove in one of said metal parts adjacent to a sealing surface and a groove in one of said flanges in a surface thereof opposite its sealing surface, locating indium in said first mentioned groove and applying pressure to said flanges at room temperature to urge said complementary surfaces together and effect a diffusion of said indium into both of said flanges said second mentioned groove accommodating the distortion of the metal of said flange caused by the pressure applied to effect the hermetic weld between said complementary surfaces.

4. A method of forming a hermetic seal between two metal parts by cold pressure welding, said metal parts having complementary surfaces with an extension projecting from one of said metal parts in the region of said surfaces, introducing indium between said surfaces and applying pressure at room temperature to urge said surfaces together and to swage said extension into mechanical locking engagement with said other metal part and to cause said indium to diffuse into said mechanically interlocked metal parts.

5. A method according to claim 4 wherein said surfaces are provided by outwardly directed flanges extending from said metal parts and said extension comprises a peripheral rim upstanding from one of said flanges.

6. A method of forming the envelope of an electron discharge device by cold pressure welding said envelope having two metal parts each of which parts has a flange portion extending therefrom, a surface of one of said flange portions being complementary with a surface of said other flange portion, a groove in one of said flange portions located in a surface opposite to one of said complementary surfaces introducing indium metal between said complementary surfaces and applying pressure to said flange at room temperature to urge said complementary surfaces together and effect a diffusion of said indium into both of said flanges said groove accommodating the distortion of the metal of said flange caused by the pressure applied to effect the hermetic weld between said complementary surfaces.

7. A method of forming the envelope of an electron discharge device with an hermetic seal by cold pressure welding, said envelope having two metal parts having complementary surfaces with an extension projecting from one of said metal parts in the region of said surfaces, introducing indium between said surfaces and applying pressure at room temperature to urge said surfaces together and to swage said extension into mechanical locking engagement with said other metal part and to cause said indium to diffuse into said mechanically interlocked metal parts.

8. A method of forming a hermetic seal between two metal parts by uniting surface sealing areas of said parts by pressure welding comprising arranging a surface sealing area of one of said parts adjacent to a surface sealing area of the other part with indium interposed between said surface sealing areas of both parts and applying a sufficient pressure to cause said surface sealing areas and said indium to make intimate contact to effect a diffusion of indium into the surface sealing areas of both said parts without the application of heat sufficient to melt the indium, and thereby form said seal.

9. A method of forming a hermetic seal between two metal parts by uniting surface sealing areas of said parts by pressure welding comprising applying to the surface sealing area of one of said parts a coating of indium arranging a surface area of said other part in contact with said indium and applying a sufficient pressure between said parts to urge said surface sealing areas to make intimate contact with said indium to effect a diffusion of indium into the surface sealing areas of both said parts without the application of heat sufficient to melt said indium, and thereby form said seal.

10. A method of forming a hermetic seal between two metal parts by uniting surface sealing areas of said parts by pressure welding comprising arranging a surface sealing area of one of said parts adjacent to a surface area of the other of said parts, interposing an insert of indium between said surface sealing areas and applying a sufficient pressure to cause both of said surface sealing areas to make intimate contact with said insert to effect a diffusion of indium into the adjacent surface sealing areas of both said parts without the application of heat sufficient to melt said indium, and thereby for said seal.

11. A method of forming the envelope of an electron discharge device by pressure welding said envelope having two metal parts having surface sealing areas, comprising arranging a surface sealing area of one of said parts adjacent to a surface sealing area of the other of said parts with indium interposed between said surface sealing areas and applying a sufficient pressure to cause said surface sealing areas and said indium to make intimate contact to effect a diffusion of indium into the adjacent sealing areas of both of said parts without the application of heat sufficient to melt said indium to thereby effect a hermetic seal between said parts.

References Cited in the file of this patent

UNITED STATES PATENTS

| | | |
|---|---|---|
| 2,269,839 | Young | Jan. 13, 1942 |
| 2,450,130 | Gordon | Sept. 28, 1948 |
| 2,525,887 | Frazier | Oct. 17, 1950 |
| 2,554,328 | Grimes | May 22, 1951 |
| 2,629,093 | Pask | Feb. 17, 1953 |
| 2,632,431 | Suter | Mar. 24, 1953 |
| 2,671,746 | Brew | Mar. 9, 1954 |
| 2,701,483 | Foxon | Feb. 8, 1955 |
| 2,703,998 | Sowter | Mar. 15, 1955 |
| 2,724,893 | O'Connor | Nov. 29, 1955 |